June 5, 1962  R. GRUNDY  3,037,727
LANDING PLATE
Filed June 15, 1960
Fig.1
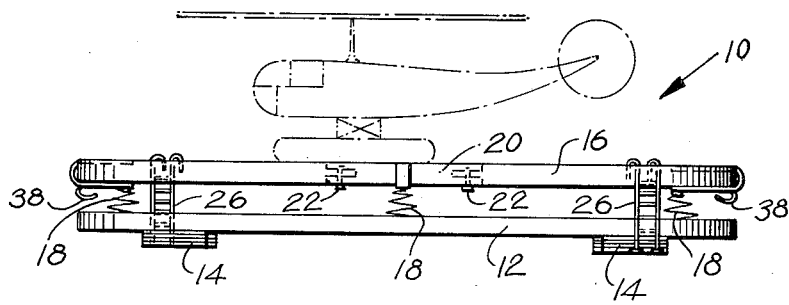
Fig.3
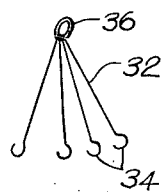
Fig.2
Fig.4
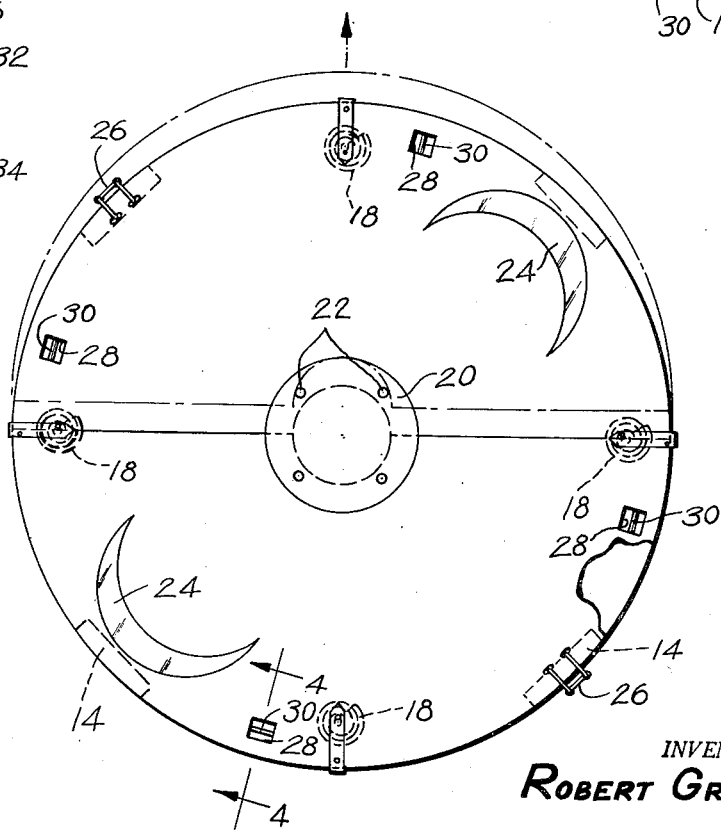
INVENTOR.
ROBERT GRUNDY

United States Patent Office 3,037,727
Patented June 5, 1962

3,037,727
LANDING PLATE
Robert Grundy, 11750 S. Homan Ave., Lot 216, Chicago 55, Ill.
Filed June 15, 1960, Ser. No. 36,217
2 Claims. (Cl. 244—114)

This invention relates to aircraft equipment and more particularly to a landing plate for helicopters.

It is an object of the present invention to provide a landing plate which will enable a helicopter to conveniently land upon the roof of substantially any building, will not damage the building, and may be readily installed and removed.

Still another object of the present invention is to provide a completely self contained helicopter landing plate of the above type which may be fabricated at the point of use, and which will effectively distribute a load upon the entire roof area so as to prevent localized impact loads from entering the roof structure.

Other objects of the invention are to provide a landing plate bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a side view of a landing plate assembly made in accordance with the present invention in actual use;

FIGURE 2 is a top plan view of the assembly shown in FIGURE 1;

FIGURE 3 is a side elevational view of a set of sling ropes forming an accessory of the present invention; and FIGURE 4 is a fragmentary cross sectional view taken along line 4—4 of FIGURE 2.

Referring now more in detail to the drawing, a helicopter landing plate assembly 10 made in accordance with the present invention is shown to include a circular base plate 12 having depending resilient feet or pads 14 which cushion the base and support it in spaced apart relationship with a supporting roof structure.

A helicopter supporting platform 16 of substantially identical size and shape as the base 12, is supported upon the base 12 by means of a plurality of circumferentially spaced apart compression coil springs 18. The central portion of this platform 16 is reinforced by a plate 20 and securement bolts 22, so as to withstand impact forces imparted thereto by a landing helicopter.

The top surface of the helicopter landing platform or deck 16 is provided with recessed lights 24 and ladders 26 to facilitate embarking and disembarking of the helicopter passengers. Also, the upper surface of the platform 16 is provided with small recesses 28 within which cross bars 30 are secured, which cross bars may be used as anchors for sling ropes 32 for tying the helicopter in place for storage or during high winds. Each sling rope 32 is provided with a hook 34 for engagement with the rod 30 and a loop 36 for connection to a mating helicopter part. Additional sling hooks 38 are provided upon the lower surface of the platform 16 for effecting the movement and placement of the assembly during installation.

It will now be recognized that this unit may be conveniently assembled upon the top of a building in a simple and effective manner. The wide spacing of the feet 14 assures the proper distribution of the loading to the roof structure, and the springs 18 effectively damp any impact forces imparted to the platform 16 by a landing helicopter. Thus, this assembly makes it possible to install landing helicopter facilities upon buildings otherwise not capable of withstanding such impact loading.

While various changes may be made in the detail construction, it shall be understood that such changes shall be within the spirit and scope of the present invention as defined by the appended claims.

What I claim as new and desire to protect by Letters Patent of the United States is:

1. A helicopter landing plate comprising in combination a base, a helicopter supporting platform, spring means yieldably supporting said supporting platform upon said base for limited relative movement, mounting means supporting said base in spaced relationship upon a building roof, said mounting means comprising a plurality of circumferentially spaced cushion pads depending from said base, tie means carried by said platform for securing a helicopter thereupon, said base comprising a substantially rigid circular plate, said helicopter supporting platform comprising a substantially rigid circular plate of identical size and shape as said base plate, said spring means comprising a plurality of compression coil springs mounted in circumferentially spaced relationship around said base and supporting platform, all of said compression coil springs extending between said base and supporting said platform and maintaining said base and supporting platform in spaced apart, parallel relationship, a pluraltiy of recessed lights within said helicopter supporting platform for guiding an aircraft in landing and a pair of ladders in spaced apart relation affixed to the periphery of said helicopter supporting platform and said base and extending vertically therebetween providing access for personnel between said helicopter supporting platform and said building roof.

2. The combination according to claim 1, wherein said tie means comprises recesses within said helicopter supporting platform having transversely extending securement rods, and a set of sling ropes for securing a helicopter upon said securement rods, whereby the helicopter is supported for movement with said supporting platform vertically and horizontally relative to said base by the yielding action of said spring means.

References Cited in the file of this patent
UNITED STATES PATENTS

| | | |
|---|---|---|
| 2,358,426 | Tompson | Sept. 19, 1944 |
| 2,807,429 | Hawkins et al. | Sept. 27, 1957 |
| 2,851,232 | Allen | Sept. 9, 1958 |
| 2,920,846 | Lingafelter | Jan. 12, 1960 |

FOREIGN PATENTS

| | | |
|---|---|---|
| 741,920 | Great Britain | Dec. 14, 1955 |